(12) United States Patent
Li et al.

(10) Patent No.: US 11,012,687 B2
(45) Date of Patent: May 18, 2021

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/559,257

(22) Filed: Sep. 3, 2019

(65) Prior Publication Data

US 2020/0107016 A1   Apr. 2, 2020

Related U.S. Application Data

(60) Provisional application No. 62/742,322, filed on Oct. 6, 2018, provisional application No. 62/739,632, filed on Oct. 1, 2018.

(51) Int. Cl.
*H04N 19/105* (2014.01)
*H04N 19/139* (2014.01)
*H04N 19/176* (2014.01)
*H04N 19/70* (2014.01)

(52) U.S. Cl.
CPC ......... *H04N 19/105* (2014.11); *H04N 19/139* (2014.11); *H04N 19/176* (2014.11); *H04N 19/70* (2014.11)

(58) Field of Classification Search
CPC ..... H04N 19/139; H04N 19/176; H04N 19/70
See application file for complete search history.

(56) References Cited

U.S. PATENT DOCUMENTS

| | | | |
|---|---|---|---|
| 2014/0355677 A1* | 12/2014 | Kondo | H04N 19/136 |
| | | | 375/240.12 |
| 2017/0188028 A1* | 6/2017 | Park | H04N 19/188 |
| 2019/0058896 A1* | 2/2019 | Huang | H04N 19/176 |
| 2019/0230364 A1* | 7/2019 | Lee | H04N 19/96 |

OTHER PUBLICATIONS

High Efficiency Video Coding, Rec. ITU-T H.265v4, Dec. 2016.
Yang, Haitao et al. "Description of CE4: Inter prediction and motion vector coding," Joint Video Experts Team of ITU-T SG 16 WP 3 and ISO/IEC JTC1/SC29/WG11, 10th Meeting: San Diego, US, Apr. 10-20, 2018.
B. Bross, J. Chen, S. Liu, "Versatile Video Coding (Draft 2)", ISO/IEC JTC1/SC29/WG11 JVET-K1001, Jul. 2018.

* cited by examiner

*Primary Examiner* — Joon Kwon
(74) *Attorney, Agent, or Firm* — Oblon, McClelland, Maier & Neustadt, L.L.P.

(57) ABSTRACT

A method of video decoding at a decoder is disclosed. The method can include receiving a current block in a picture, and determining whether a size of the current block is smaller than or equal to a size threshold. When the size of the current block is smaller than or equal to the size threshold, one or more types of sub-block based merge candidates for decoding the current block can be disabled.

19 Claims, 16 Drawing Sheets

| | |
|---|---|
| 1 | ...... |
| 2 | } else { /* MODE_INTER */ |
| 3 | if( cu_skip_flag[ x0 ][ y0 ] ) { |
| 4 | if( (sps_affine_enabled_flag \|\| sps_atmvp_enabled_flag \|\| sps_mvplanar_enabled_flag) && !(cbWidth <8 \|\| cbHeight <8)) |
| 5 | merge_subblock_flag[ x0 ][ y0 ] |
| 6 | if( MaxNumMergeCand > 1 ) |
| 7 | merge_idx[ x0 ][ y0 ] |
| 8 | } else { |
| 9 | merge_flag[ x0 ][ y0 ] |
| 10 | if( merge_flag[ x0 ][ y0 ] ) { |
| 11 | if( (sps_affine_enabled_flag \|\| sps_atmvp_enabled_flag \|\| sps_mvplanar_enabled_flag) && !(cbWidth <8 \|\| cbHeight <8)) |
| 12 | merge_subblock_flag[ x0 ][ y0 ] |
| 13 | if( MaxNumMergeCand > 1 ) |
| 14 | merge_idx[ x0 ][ y0 ] |
| 15 | } else { |
| 16 | ...... |

*FIG. 11*

| | |
|---|---|
| 1 | ..... |
| 2 | } else { /* MODE_INTER */ |
| 3 | if( cu_skip_flag[ x0 ][ y0 ] ) { |
| 4 | if( ( sps_affine_enabled_flag || sps_atmvp_enabled_flag || sps_mvplanar_enabled_flag) && !( cbWidth <16 && cbHeight < 16)) |
| 5 | merge_subblock_flag[ x0 ][ y0 ] |
| 6 | if( MaxNumMergeCand > 1 ) |
| 7 | merge_idx[ x0 ][ y0 ] |
| 8 | } else { |
| 9 | merge_flag[ x0 ][ y0 ] |
| 10 | if( merge_flag[ x0 ][ y0 ] ) { |
| 11 | if( ( sps_affine_enabled_flag || sps_atmvp_enabled_flag || sps_mvplanar_enabled_flag) && !( cbWidth <16 && cbHeight < 16)) |
| 12 | merge_subblock_flag[ x0 ][ y0 ] |
| 13 | if( MaxNumMergeCand > 1 ) |
| 14 | merge_idx[ x0 ][ y0 ] |
| 15 | } else { |
| 16 | ..... |

FIG. 12

| | |
|---|---|
| 1 | ...... |
| 2 | } else { /* MODE_INTER */ |
| 3 | if( cu_skip_flag[ x0 ][ y0 ] ) { |
| 4 | if( ( sps_affine_enabled_flag \|\| sps_atmvp_enabled_flag \|\| sps_mvplanar_enabled_flag) && !( cbWidth * cbHeight < 64 ) ) |
| 5 | merge_subblock_flag[ x0 ][ y0 ] |
| 6 | if( MaxNumMergeCand > 1 ) |
| 7 | merge_idx[ x0 ][ y0 ] |
| 8 | } else { |
| 9 | merge_flag[ x0 ][ y0 ] |
| 10 | if( merge_flag[ x0 ][ y0 ] ) { |
| 11 | if( ( sps_affine_enabled_flag \|\| sps_atmvp_enabled_flag \|\| sps_mvplanar_enabled_flag) && !( cbWidth * cbHeight < 64 ) ) |
| 12 | merge_subblock_flag[ x0 ][ y0 ] |
| 13 | if( MaxNumMergeCand > 1 ) |
| 14 | merge_idx[ x0 ][ y0 ] |
| 15 | } else { |
| 16 | ...... |

METHOD AND APPARATUS FOR VIDEO CODING

INCORPORATION BY REFERENCE

This present disclosure claims the benefit of priority to U.S. Provisional Application No. 62/739,632, "Methods of Sub-block Merge Mode Constraints", filed on Oct. 1, 2018, and No. 62/742,322, "Methods of Constraints on Sub-Block Based Merge List Construction", filed on Oct. 6, 2018, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide a method of video decoding at a decoder. The method can include receiving a current block in a picture, and determining whether a size of the current block is smaller than or equal to a size threshold. When the size of the current block is smaller than or equal to the size threshold, one or more types of sub-block based merge candidates for decoding the current block can be disabled.

In an embodiment, a sub-block based merge candidate list is disabled for decoding the current block when the size of the current block is smaller than or equal to a size threshold. In an embodiment, a flag indicating whether the sub-block based merge candidate list is used for decoding the current block is inferred as false when the size of the current block is smaller than or equal to a size threshold. In an embodiment, when the size of the current block is greater than the size threshold, a flag indicating whether the sub-block based merge candidate list is used for decoding the current block is received.

In an embodiment, the size threshold is a type-related size threshold defined for a first type of the one or more types of sub-block based merge candidates. When the size of the current block is smaller than or equal to the type-related size threshold defined for the first type of the one or more types of sub-block based merge candidates, the first type of the one or more types of sub-block based merge candidates is disabled. In one example, a sub-block based merge candidate list for decoding the current block is constructed. Sub-block merge candidates of the first type of the one or more types of sub-block based merge candidates are excluded from the sub-block based merge candidate list.

In an embodiment, the determining whether the size of the current block is smaller than or equal to the size threshold includes determining whether a height or a width of the current block is smaller than or equal to the size threshold. In an embodiment, the determining whether the size of the current block is smaller than or equal to the size threshold includes determining whether a height and a width of the current block are both smaller than or equal to the size threshold. In an embodiment, the determining whether the size of the current block is smaller than or equal to the size threshold includes determining whether a number of samples in the current block is smaller than or equal to the size threshold.

In an embodiment, the samples in the current block are luma or chroma samples. In an embodiment, the method further includes receiving a syntax element indicating the size threshold. In an embodiment, the method further includes decoding the current block with a merge mode or a skip mode.

In an embodiment, the method further includes receiving a second flag indicating whether a skip mode is enabled for coding the current block. When the skip mode is disabled, a third flag indicating whether a merge mode is enabled for coding the current block is received.

In an embodiment, the one or more types of sub-block based merge candidates include one of affine merge candidate, sub-block based temporal motion vector prediction (SbTMVP) candidate, spatial-temporal motion vector prediction (STMVP) candidate, or planar motion vector prediction candidate.

In an embodiment, the method further includes constructing a sub-block based merge candidate list. When a number of available sub-block merge candidates in the sub-block based merge candidate list is less than a maximum allowed number of sub-block merge candidates, generated sub-block merge candidates are added to the sub-block based merge candidate list until a number of sub-block merge candidates in the sub-block based merge candidate list is equal to the maximum allowed number of sub-block merge candidates. In one example, zero motion candidates are added to the sub-block based merge candidate list. In one example, combined bi-predictive sub-block merge candidates are added to the sub-block based merge candidate list.

Aspects of the disclosure provide another method of video decoding at a video decoder. The method can include receiving a current block in a picture to be decoded using a sub-block based merge candidate list including one or more types of sub-block based merge candidates, determining whether a size of the current block is smaller than or equal to a respective size threshold for each of the one or more types of sub-block based merge candidates, and when the size of the current block is smaller than or equal to the respective size threshold, disabling the respective type of sub-block based merge candidates for decoding the current block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 11-13 show syntax tables according to some embodiments.

DETAILED DESCRIPTION OF EMBODIMENTS

I. Video Coding Encoder and Decoder

Figure 1:
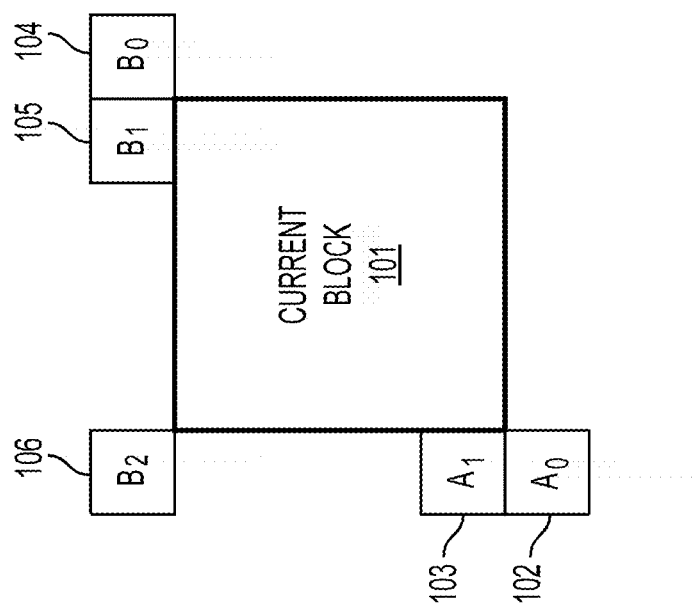
FIG. 1 is a schematic illustration of a current block and its surrounding spatial merge candidates in one example.
Figure 2:
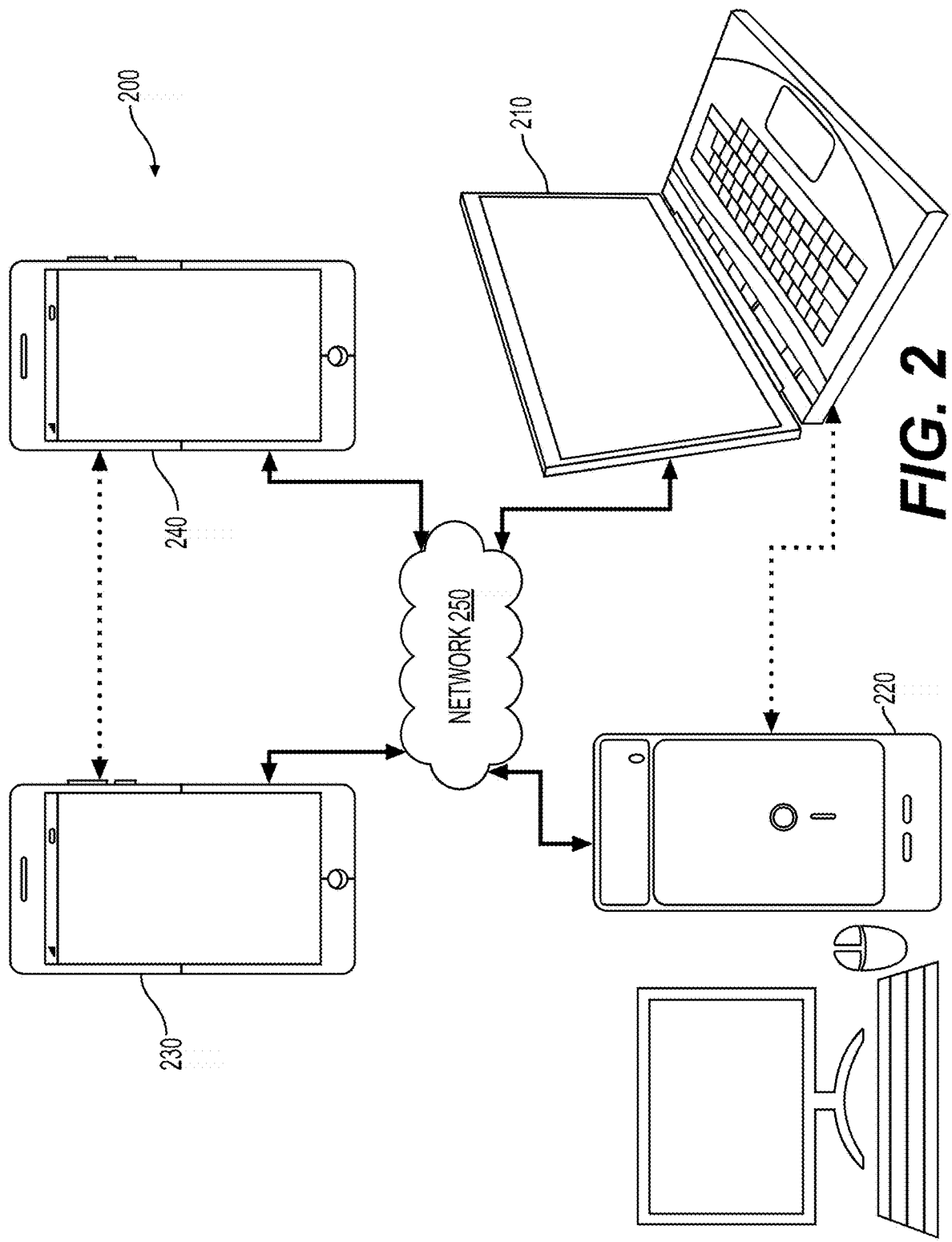
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
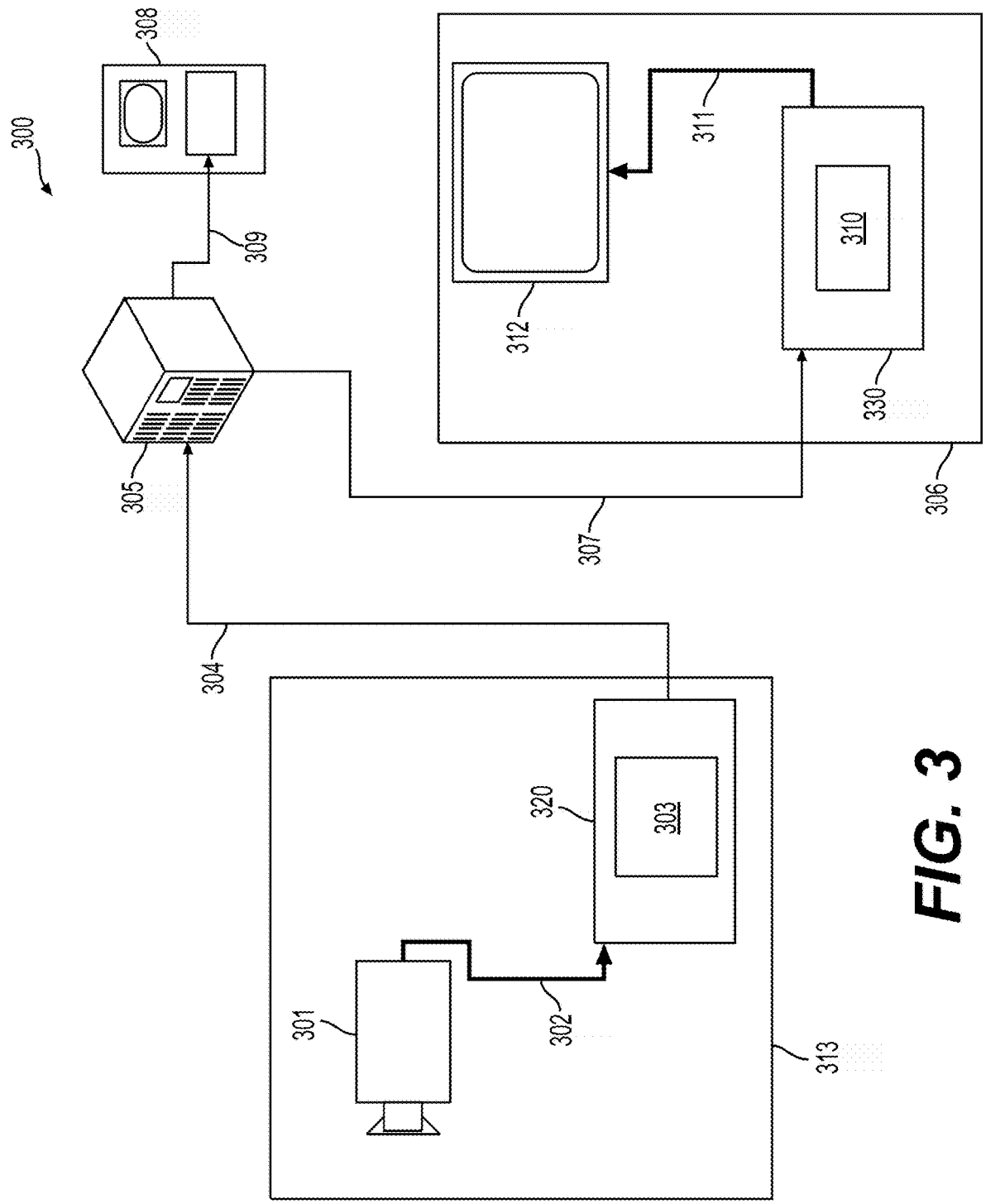
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
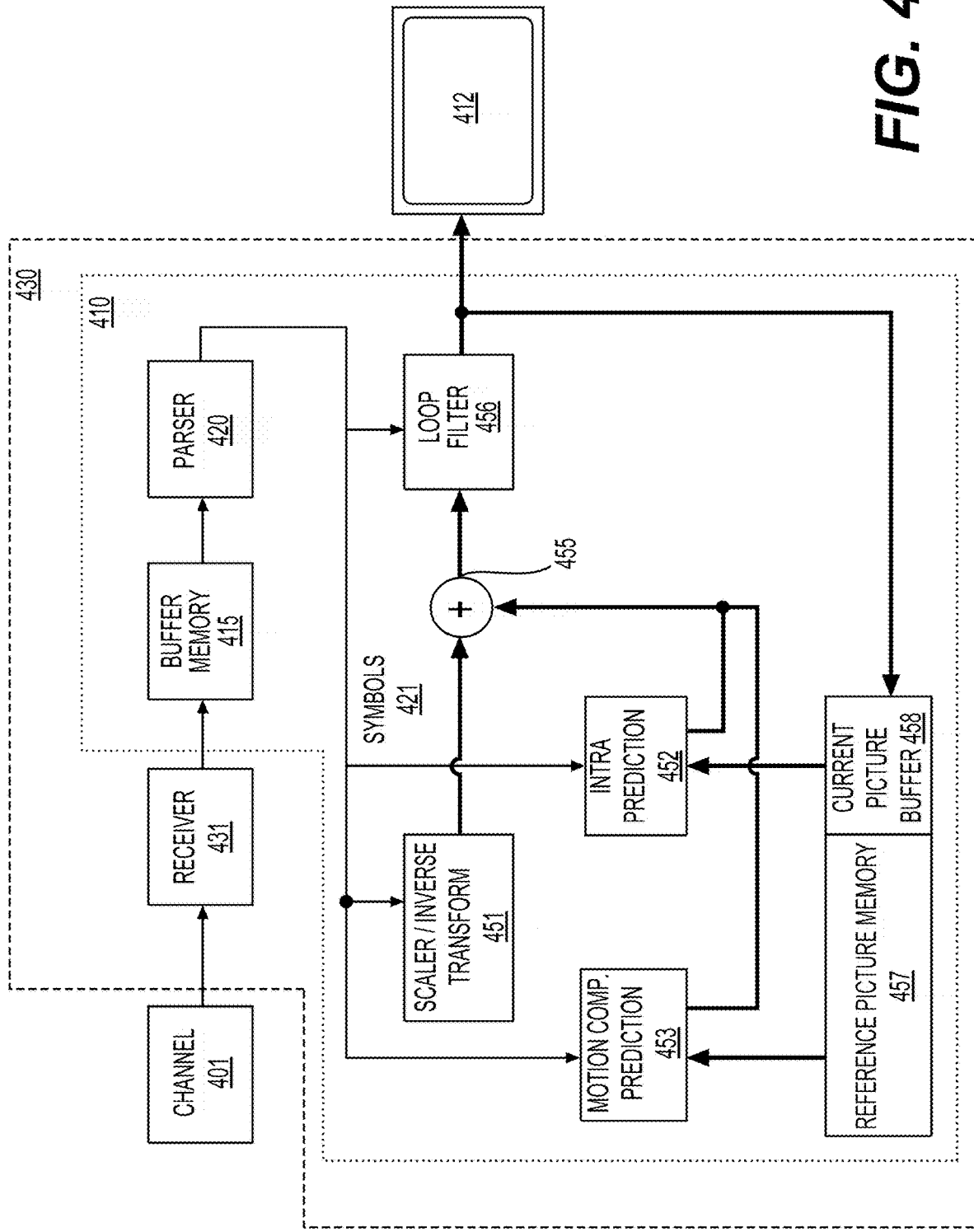
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
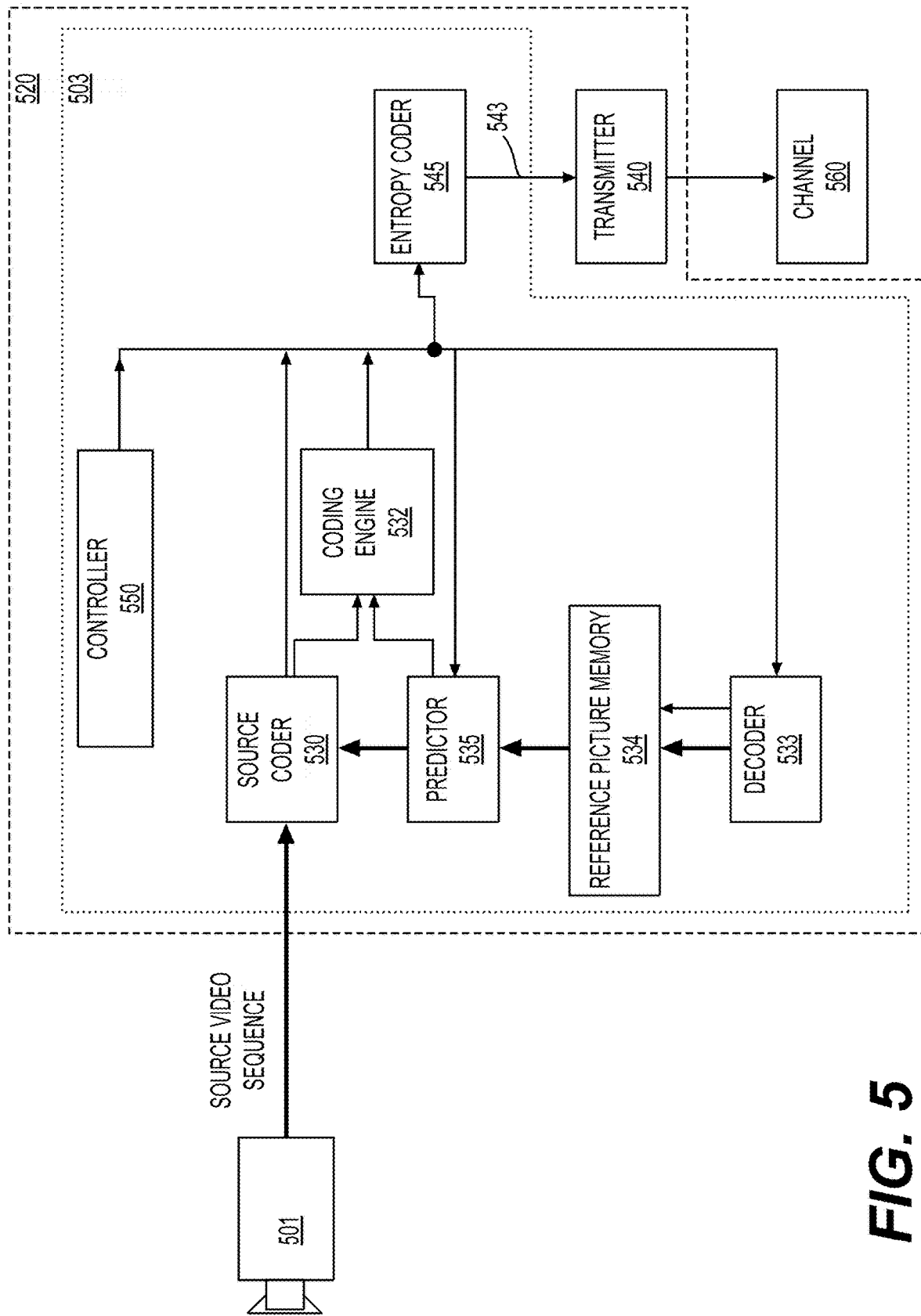
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
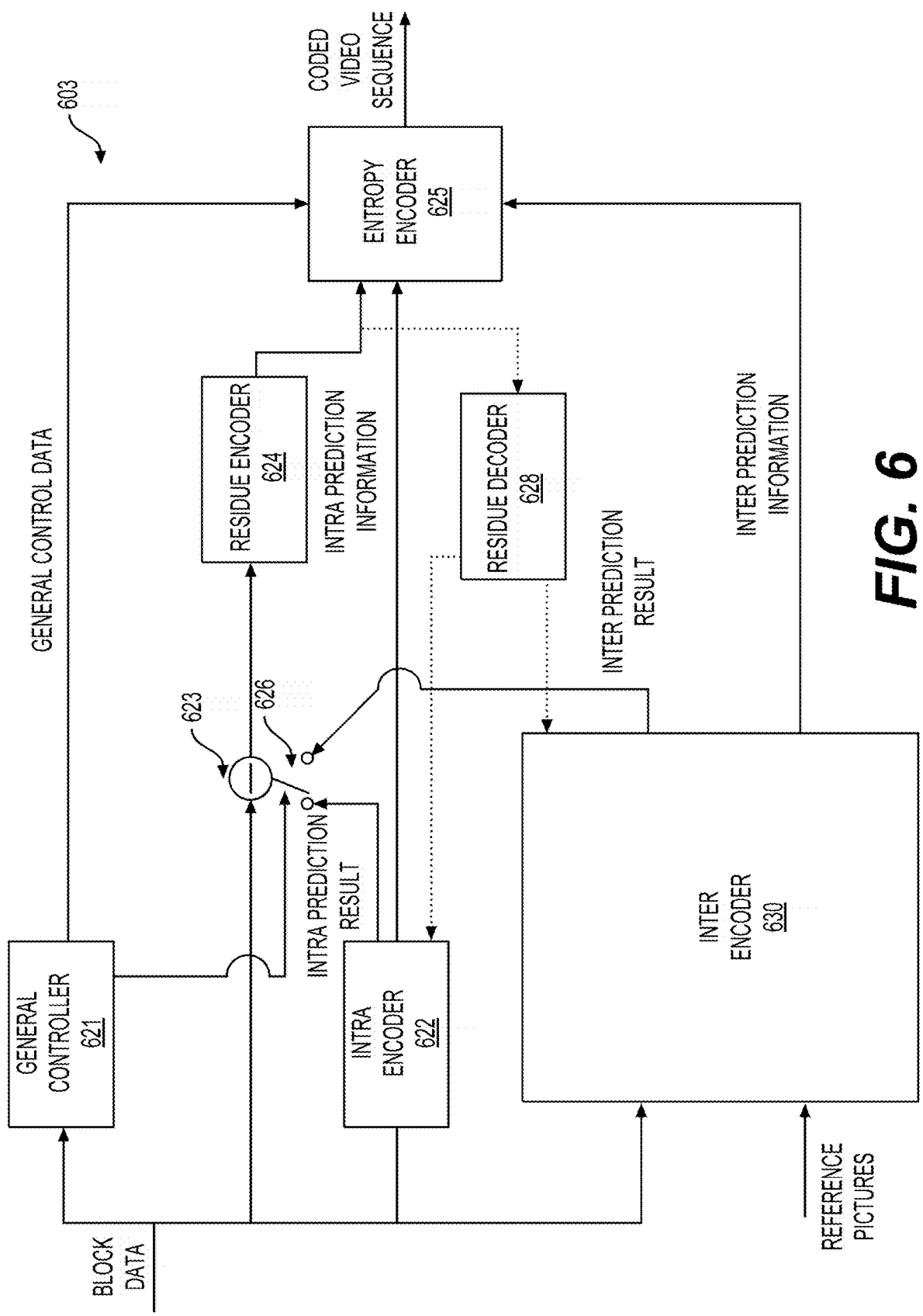
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
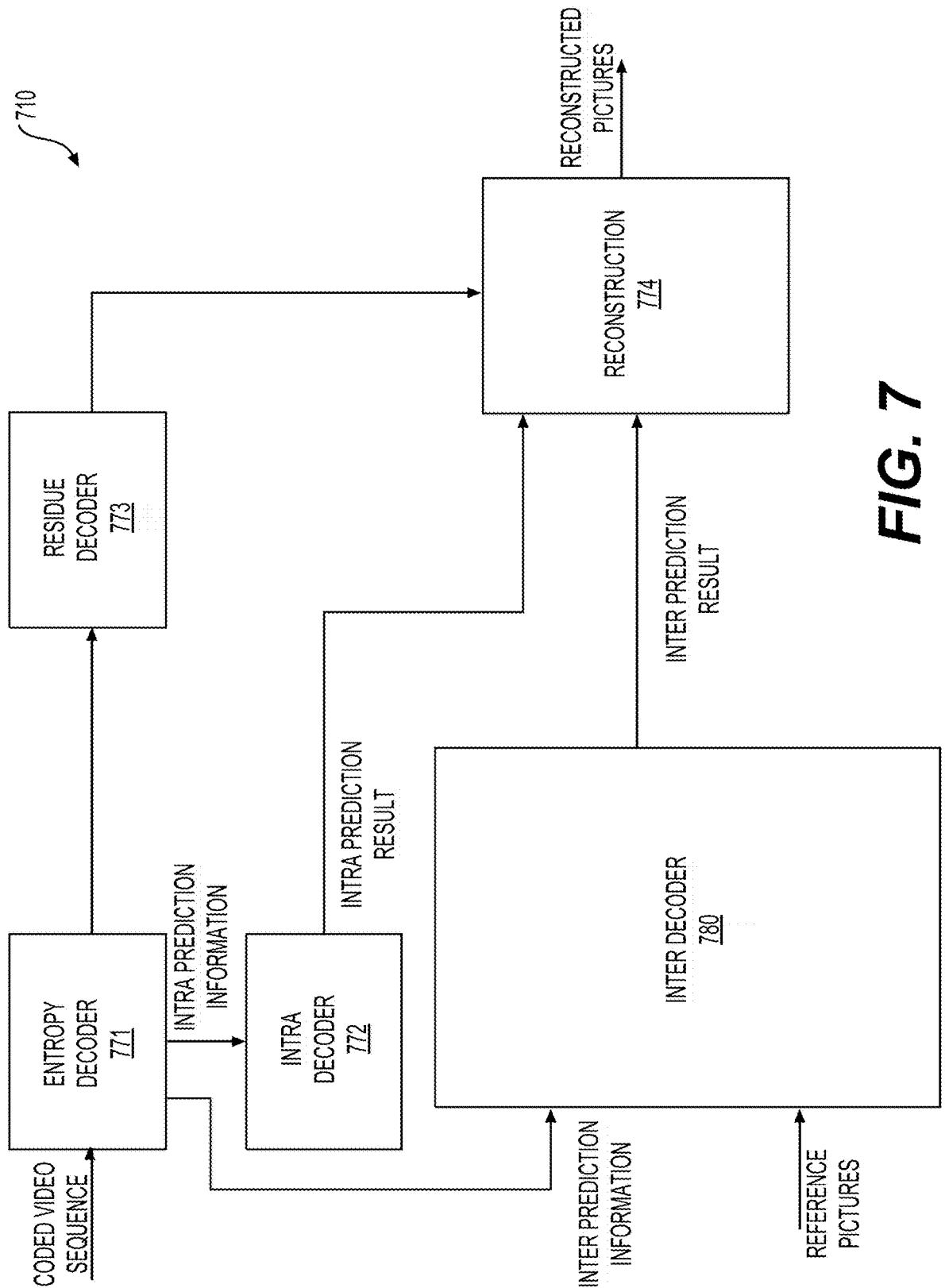
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Sub-Block Based Merge Modes and Sub-Block Based Merge Candidate List

Examples of sub-block (or sub-CU) based merge modes can include affine merge mode, sub-block based temporal motion vector prediction (SbTMVP) mode (also referred to as advanced temporal motion vector prediction (ATMVP) mode), inter planar motion vector (MV) prediction mode, spatial-temporal motion vector prediction (STMVP) mode, and the like. Different types of merge candidates corresponding to different types of sub-block based merge modes can be included in a sub-block based merge candidate list for prediction of motion vectors of a coding block.

1. Affine Merge Mode

In affine motion compensation, a 6-parameter or a simplified 4-parameter affine model can be used to efficiently predict motion information for all samples within a current block. For example, in an affine coded or described coding block, different part of the samples can have different motion vectors. The basic unit to have a motion vector in an affine coded or described block is referred to as a sub-block. The size of a sub-block can be as small as 1 sample only, and can be as large as the size of the current block in different embodiments.

When an affine merge mode is used for encoding or decoding a current block, a motion vector (relative to the targeted reference picture) can be derived for each sample in the current block using an affine model represented by an affine merge candidate. In order to reduce implementation complexity, in some examples, affine motion compensation is performed on a sub-block basis, instead of a sample basis. For example, each sub-block will have a motion vector derived from the affine model. For samples in each sub-block, the motion vectors are the same. A specific location of each sub-block is assumed, such as the top-left or the center point of the sub-block, to be the representative location of the respective sub-block for deriving the respective motion vector based on the affine model. In an example, a sub-block has a size of 4×4 samples.

In one example, when an affine merge mode is used, an affine model represented by motion vectors at a set of control points of a current block is used as a merge candidate included in a sub-block based merge candidate list. Such a type of the affine merge candidate is referred to as a constructed affine candidate which is constructed based on the motion vectors at the control points of the current block.

In one example, when an affine merge mode is used, an affine model of a spatial or temporal neighbor block of the current block is used as a merge candidate included in a sub-block based merge candidate list. Such a type of the affine merge candidate is referred to as an inherited affine candidate which is inherited from an affine coded neighbor block of the current block.

Usage of affine merge mode may involve large computational cost and high memory access volume. For example, a bi-directional affine merge mode leads to multiple bi-directional predicted 4×4 blocks, and can increases memory bandwidth requirement significantly. Thus affine merge mode has a high implementation complexity when implemented with hardware.

2. Sub-Block Based TMVP (SbTMVP) Mode

Figure 8:
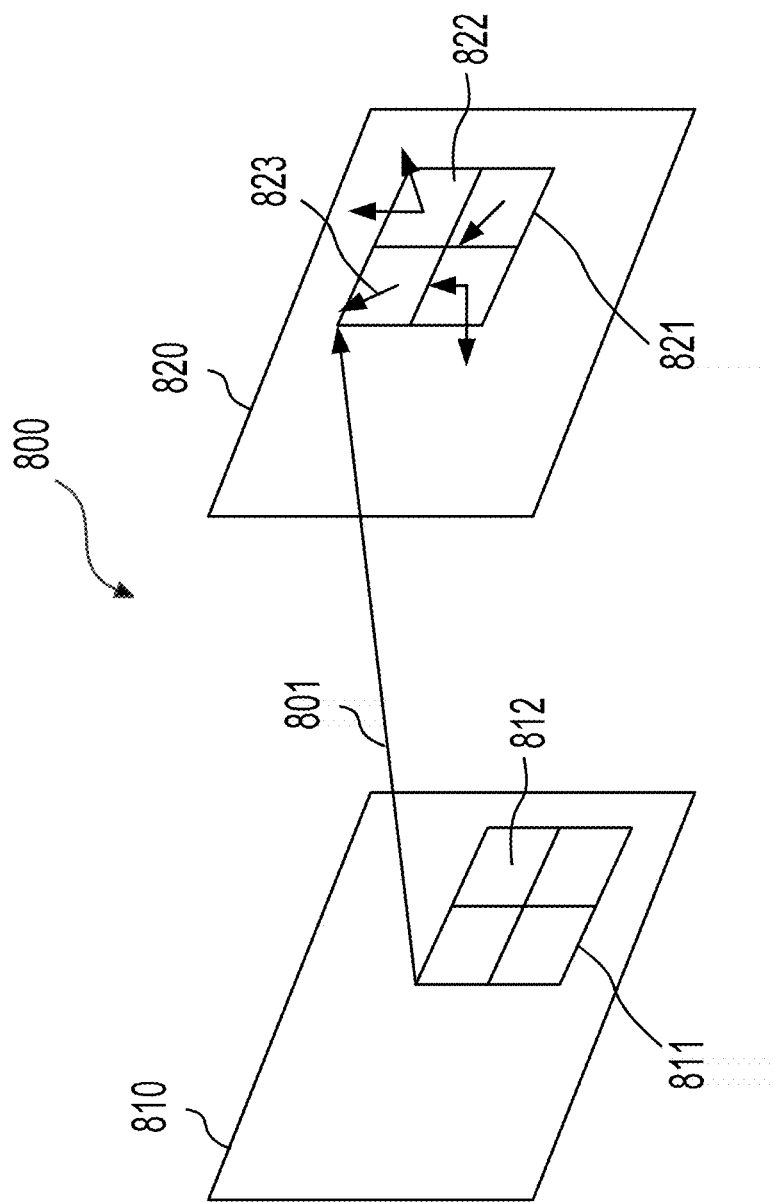
FIG. 8 shows a coding process of the sub-block based temporal motion vector prediction (SbTMVP) mode according to an embodiment.

In the SbTMVP mode, temporal motion vector prediction for a current block (or a current coding unit), as used in merge mode defined in HEVC standard, is modified. Multiple sets of motion information (including motion vectors and reference indices) are fetched from blocks smaller than the current block. FIG. 8 shows a coding process (800) of the SbTMVP mode according to an embodiment.

During the SbTMVP mode coding process (800), predictions of motion vectors of sub-CUs 812 within a CU 811 in a current picture (810) can be obtained in two steps. The first step is to identify a corresponding block (821) in a reference picture (820) with a so-called temporal vector (801). The reference picture (820) is called the motion source picture (820). The second step is to split the current CU (811) into the sub-CUs (812) and obtain the predictions of motion vectors as well as the reference indices of each sub-CU (812) from blocks (822) corresponding to each sub-CU (812). In one example, the sub-CUs (812) are square blocks each having a size of N×N samples. In one example, N is set to 8 by default.

In the first step, the reference picture (820) and the corresponding block (821) can be determined by motion information of one of spatial neighboring blocks of the current CU (811). In some examples, to avoid a repetitive scanning process of neighboring blocks, the first merge candidate in a merge candidate list of the current CU (811) can be used as the temporal vector (801). For example, a first available motion vector as well as its associated reference index on the merge candidate list are set to be the temporal vector (801) and the index to the motion source picture (820). This way, the corresponding block (821) may be more accurately identified, compared with the temporal motion vector prediction in HEVC where a corresponding block (sometimes called a collocated block) is always at a bottom-right or center position relative to a current CU.

In the second step, for each sub-CU (812), motion information (823) of the block (822) (from a smallest motion grid that covers a center sample of the block (822)) is used to derive the motion information for the sub-CU (812). After the motion information (823) of the corresponding N×N block (822) is identified, the motion information (823) is converted to the motion vectors and reference indices of the current sub-CU (812), in the same way as temporal motion vector predication in HEVC. For example, motion scaling and other procedures may apply. For example, a decoder can check whether a low-delay condition (i.e. picture order counts (POCs) of all reference pictures of the current picture are smaller than a POC of the current picture) is fulfilled. In some examples, motion vector MVx (the motion vector corresponding to reference picture list X) can be used to predict motion vector MVy (with X being equal to 0 or 1 and Y being equal to 1−X) for each sub-CU (812).

3. Planar MV Prediction Mode

Figure 9A:
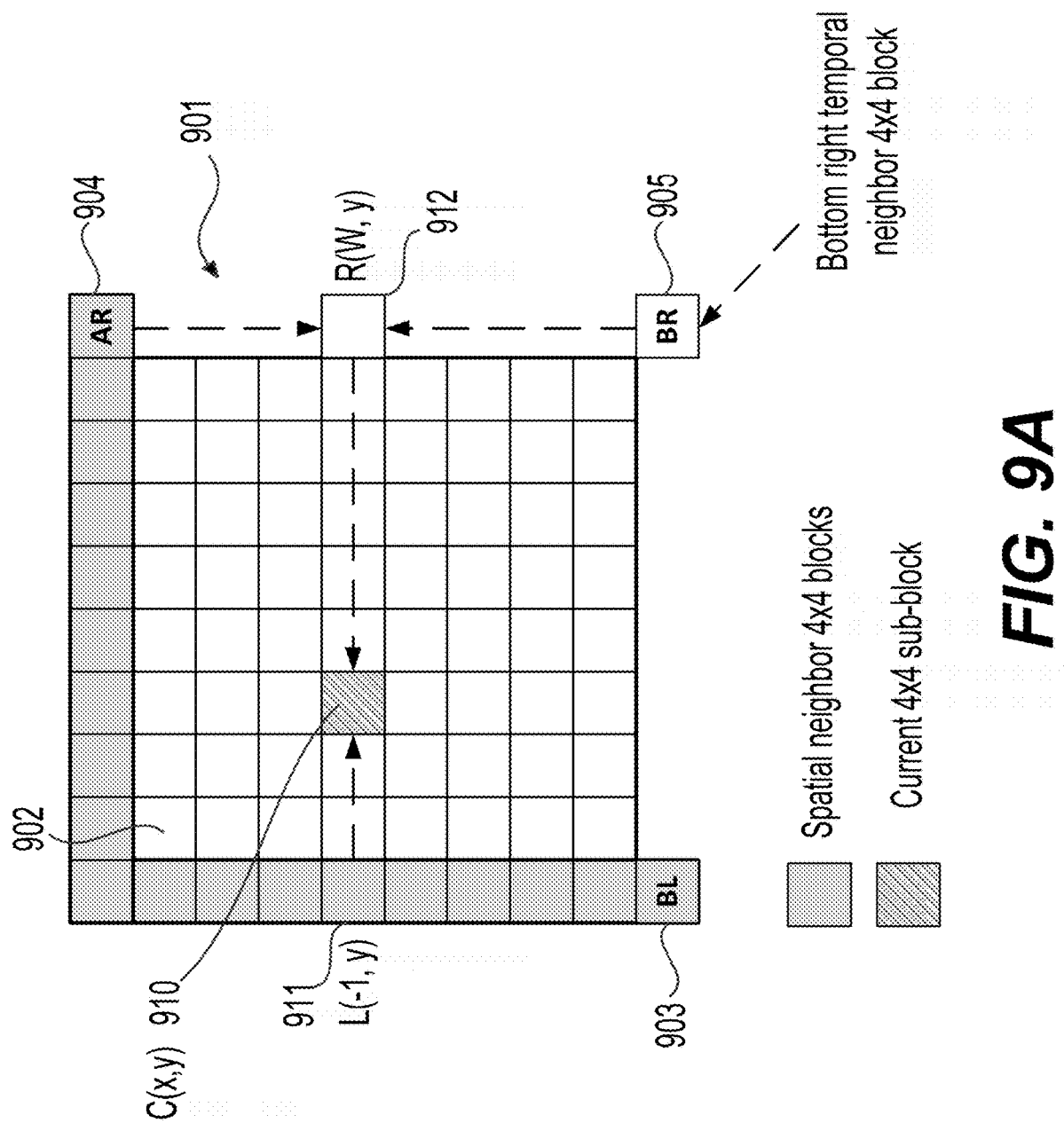
FIGS. 9A-9B show a planar motion vector (MV) prediction process according to an embodiment.
Figure 9B:
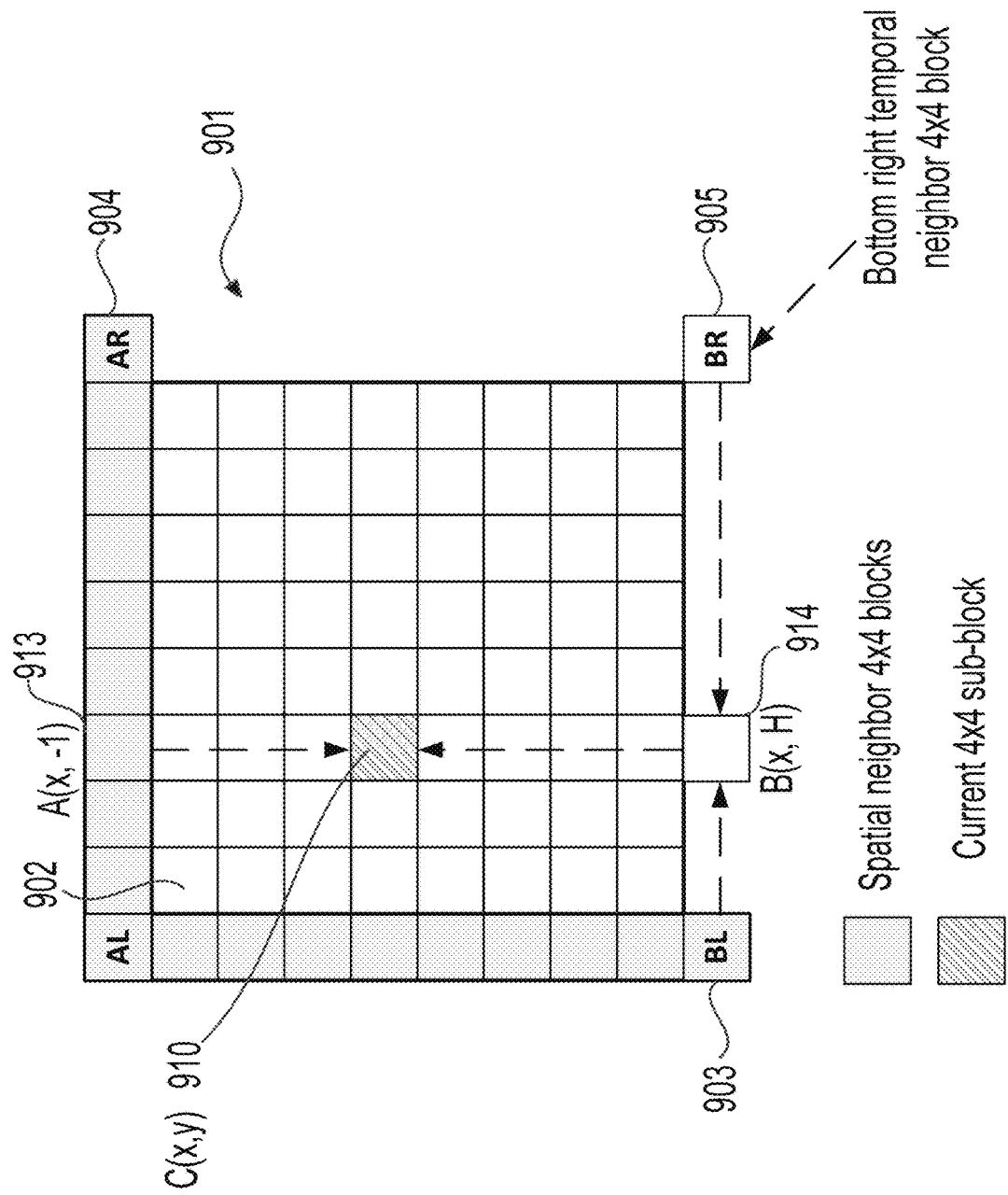

A planar MV prediction mode (also referred to as inter planar MV prediction mode, or inter planar mode) can provide a special merge candidate with sub-block MVs. The planar MV prediction mode can be used to generate a smooth fine granularity motion field. FIGS. 9A-9B show a planar MV prediction process according to an embodiment.

In FIGS. 9A-9B, a current block (901) is partitioned into sub-blocks, for example, each having a size of 4×4 samples. The current block (901) can have a width of W samples and a height of H samples. The sub-block (910) at position (x, y), referred to as a current sub-block, is used as an example to illustrate how a motion vector P(x, y) of the sub-block (910) is derived. The coordinates (x, y) is with respect to the top-left sub-block (902) within the current block (901) which has a coordinate of (0, 0).

For example, the motion vector P(x, y) can be derived by averaging a horizontal linear interpolation $P_h(x,y)$ and a vertical linear interpolation $P_v(x,y)$ on 4×4 block basis as follows, $$P(x,y)=(H \times P_h(x,y)+W \times P_v(x,y)+H \times W)/(2 \times H \times W).$$

The horizontal linear interpolation $P_h(x,y)$ and the vertical linear interpolation $P_v(x,y)$ can be derived in one example according to, $$P_h(x,y)=(W-1-x) \times L(-1,y)+(x+1) \times R(W,y)$$

$$P_v(x,y)=(H-1-y) \times A(x,-1)+(y+1) \times B(x,H)$$

where L(−1,y) and R(W,y) are motion vectors of the 4×4 blocks (911) and (912) to the left and right of the current block (901), and A(x, −1) and B(x,H) are the motion vectors of the 4×4 blocks (913) and (914) to the above and bottom of the current block (901).

Computation of motion vectors of the right column neighbor 4×4 blocks can be based on derived motion information, denoted by BR, of a bottom right temporal neighbor 4×4 block (905) along with motion information, denoted by AR, of the above right neighbor 4×4 block (904). Computation of motion vectors of the bottom row neighbor 4×4 blocks can be based on derived motion information of the bottom right neighbor 4×4 block (905) along with motion information, denoted by BL, of the bottom left neighbor 4×4 block (903).

As an example, the motion vectors R(W,y) and B(x,H) can be determined according to, $$R(W,y)=((H-y-1)AR-(y-1)BR)/H$$

$$B(x,H)=((W-x-1)BL+(x+1)BR)/W.$$

4. STMVP Mode

Figure 10:
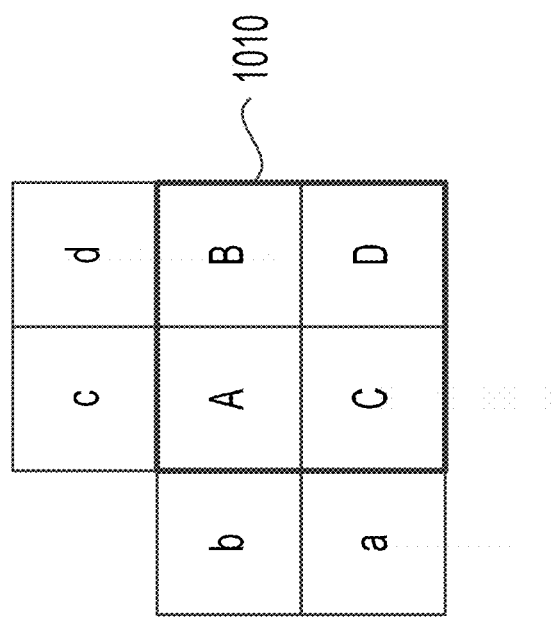
FIG. 10 shows a process of a spatial-temporal motion vector prediction (STMVP) mode according to an embodiment.

In an STMVP mode, motion vectors of sub-CUs of a current CU (or a current block) can be derived recursively, following a raster scan order. FIG. 10 shows an STMVP process according to an embodiment. In FIG. 10, an 8×8 CU (1010) is partitioned into four 4×4 sub-CUs (or sub-blocks) A, B, C, and D. Four neighboring 4×4 blocks of the current CU (1010) in a current picture are labelled as a, b, c, and d. In other examples, the sub-CUs may have different size.

For example, motion derivation for sub-CU A can start by identifying two spatial neighbors of sub-CU A. The first considered neighbor is the 4×4 block above sub-CU A (block c). If block c is not available or is intra coded, the other 4×4 blocks above sub-CU A are checked (from left to right, starting at block c). The second neighbor is the 4×4 block to the left of the sub-CU A (block b). If block b is not available or is intra coded, other blocks to the left of sub-CU A are checked (from top to bottom, staring at block b). Motion information obtained from the two neighboring blocks for each reference picture list is scaled to a first reference picture for a given list. Next, a temporal motion vector predictor of sub-block A is derived, for example, by following the same procedure of TMVP derivation as specified in HEVC. For example, motion information of a collocated block in a reference picture at location D is fetched and scaled accordingly. Finally, after retrieving and scaling the motion information of two spatial neighbors and one temporal neighbor (if available), all available motion vectors (up to 3) can be averaged separately for each reference picture list. The averaged motion vector is assigned as the motion vector prediction of the current sub-CU (1010).

5. Sub-Block Based Inter Merge Candidate List

Affine merge mode, inter planar mode, STMVP mode, and SbTMVP mode are all sub-block based merge mode. When a sub-block based merge mode is used for processing a current block, the current block is partitioned into sub-blocks. MV values among those sub-blocks are derived and used as MV predictions for encoding or decoding the current block. It is noted that, affine merge mode, inter planar mode, STMVP mode, and SbTMVP mode are used as examples for illustrating sub-block based merge mode. In other examples, other types of sub-block based merge modes may be used.

In an embodiment, different types of sub-block based merge candidates corresponding to different sub-block based merge mode can be determined and included in a sub-block based merge candidate list for processing a current bock. The sub-block based merge candidate list can be separate from a block based inter merge candidate list as used in HEVC or in the test model of Versatile Video Coding (VVC), VTM-2.0.

In one example, the sub-block based merge candidate list can be constructed according to the following steps:

(i) Insert an SbTMVP candidate that includes sub-block motion vectors derived with an SbTMVP mode.

(ii) Insert an STMVP candidate that includes sub-block motion vectors derived with an STMVP mode.

(iii) Insert a set of inherited affine candidates obtained with an affine merge mode.

(iv) Insert a set of constructed affine candidates obtained with an affine merge mode.

(v) Insert a planar MV prediction candidate that includes sub-block motion vectors derived with a planar MV prediction mode.

(vi) Pad with zero motion vectors.

In the above steps, different types of sub-block based merge candidates are added to the sub-block based merge candidate list until a maximum allowed number of the sub-block based merge candidate list is reached. When available sub-block based merge candidates cannot fill all positions of the sub-block based merge candidate list, generated candidates (e.g., zero motion vectors) can be filled.

When a separate sub-block based inter merge candidate list is used, there may be a usage flag following a merge flag in a bit stream to indicate the usage of a sub-block based merge candidate list.

III. Enabling and Disabling a Sub-Block Based Inter Merge Candidate List

In some embodiments, a sub-block based inter merge candidate list (also referred to as a sub-block merge list, or a sub-block merge candidate list) is separate from a block based inter merge candidate list (or referred to as a block merge list). When a sub-block merge list is utilized, high computational cost may be incurred. For example, when adding a sub-block based merge candidate to the sub-block merge list, a pruning process may be performed. The pruning process may involve comparing the to-be-added candidate with a candidate on the sub-block merge list. As described, a candidate on the sub-block merge list can include motion vectors from multiple sub-blocks that are much more than motion vectors of a candidate on a block merge list. Accordingly, more computational cost can be incurred for pruning of the sub-block merge list compared with the block merge list. As a result, when a region within a picture includes a large number of small coding blocks, processing those small coding blocks with sub-block based merge modes may become prohibitive.

To solve the above problem, in some embodiments, the sub-block merge list can be disabled when a current block having a small size when compared with a size threshold. As a result, no sub-block based merge mode is used for encoding or decoding the current block having the small size.

In some examples, when sub-block based merge candidates are constructed in a separate list, a threshold of the current block size can be used. When the current block size is below the threshold, the sub-block based merge list is disabled for the current block. In some examples, when sub-block based merge candidates are constructed in a separate list, a threshold of the current block's number of pixels (or samples) can be used. When the number of pixels of the block is below the threshold, the sub-block based merge list is disabled for the current block.

In some examples, when a sub-block merge candidate list is used as an individual merge list, only sub-block based candidates are included in the sub-block merge candidate list. The sub-block based candidates may be any kind of sub-block based inter merge candidates, and are not limited to the aforementioned sub-block based merge candidate types (affine candidate, SbTMVP candidate, STMVP candidate, Planar MV candidate, etc.). A set of unified conditions can be used to enable or disable sub-block based MV prediction modes associated with the sub-block merge candidate list.

Embodiment A

In one embodiment, a predefined threshold may be used to constrain the size of a current block which may use a sub-block based merge list. When the height or width of the current block is smaller than the threshold, the sub-block based merge list will not be used. In other words, all sub-block merge modes are disabled for the current block. A usage flag of a sub-block based merge list may be inferred as false. In one example, the predefined threshold may be 16 luma samples. In another example, the predefined threshold may be 8 luma samples. The value of the threshold may be any number, and is not limited to the examples.

In another embodiment, the threshold, instead of being predefined, may be signaled in a bitstream. For example, the threshold can be signaled in a sequence parameter set (SPS), a picture parameter set (PPS), a slice header, a tile group header, and the like.

FIG. 11 shows a syntax table (1100) according to an embodiment of the disclosure. The syntax table (1100) includes 16 lines of syntax describing how syntax elements are transmitted in a bit stream and how the syntax elements are parsed when the bitstream is processed at a decoder. Those syntax elements provide parameters needed for decoding a current block (or coding unit) at a position having coordinates of [x0, y0].

Specifically, at line 3, it is determined if a skip mode is to be used by checking the cu_skip_flag[x0][y0]. If the skip mode is not used, starting from line 9, a merge mode is considered. When the current block is processed with the skip mode, a residue of the current block is coded and transmitted in the bitstream. When the current block is processed with merge mode, no residue signal is generated or coded.

When the skip mode is used, at line 4, it is determined if a sub-block merge list is enabled or disabled by checking the condition "(sps_affine_enabled_flag||sps_atmvp_enabled_flag||sps_mvplanar_enabled_flag) && !(cbWidth <8||cbHeight <8)". Particularly, the condition "!(cbWidth <8||cbHeight <8)" indicates if a width (denoted by cbWidth) or height (cbHeight) of the current block is smaller than a threshold (8 samples). When the width (denoted by cbWidth) or height (cbHeight) of the current block is smaller than the threshold, the condition "!(cbWidth <8||cbHeight <8)" would be false. Accordingly, the condition "(sps_affine_enabled_flag||sps_atmvp_enabled_flag||sps_mvplanar_enabled_flag) && !(cbWidth <8||cbHeight <8)" would be false and the sub-block merge list would be disabled.

If the sub-block merge list is enabled (e.g., either of the width or height is larger or equal to the threshold (8 samples), the syntax element "merge_subblock_flag[x0][y0]" (which is a usage flag) is transmitted in the bitstream. Or, in other words, the next syntax element in the bitstream is interpreted as "merge_subblock_flag[x0][y0]". For example, the syntax element "merge_subblock_flag[x0][y0]" can indicate whether a sub-block merge list is to be used.

In contrast, if the sub-block merge list is disabled, the syntax element "merge_subblock_flag[x0][y0]" would not be transmitted in the bitstream. Accordingly, the decoder would infer the "merge_subblock_flag[x0][y0]" as false, and would not use the sub-block merge list for decoding the current block.

Similarly, when the merge mode is used, at line 11, a size threshold (8 samples) is used to determine if the next syntax element is the "merge_subblock_flag [x0][y0]". When the weight or height of the current block is greater or equal to the size threshold, the next syntax element is not the "merge_subblock_flag [x0][y0]". The decoder would interpreted the "merge_subblock_flag[x0][y0]" as false, and would not use the sub-block merge list for decoding the current block.

Embodiment B

In another embodiment, a predefined threshold may be used to constrain the size of a current block which may use a sub-block based merge list. When the height and width of the current block are both smaller than the threshold, all sub-block merge modes are disabled for the current block. A usage flag of a sub-block based merge list may be inferred as false. In one example, the predefined threshold may be 16 luma samples. In another example, the predefined threshold may be 8 luma samples. The value of the threshold may be any number of samples and is not be limited to the examples.

In another embodiment, the threshold, instead of being predefined, may be signaled in a bitstream. For example, the threshold can be signaled in a sequence parameter set (SPS), a picture parameter se t(PPS), a slice header, a tile group header, and the like.

FIG. 12 shows a syntax table (1200) according to an embodiment of the disclosure. The syntax table (1200) is similar to the syntax table (1100). A size threshold (16 samples) is used at line 4 and line 11 to determine if a sub-block merge list is disabled for decoding a current block at the position of [x0, y0]. In contrast to FIG. 11, the condition for comparing the width and height of the current block is represented as "!(cbWidth <16 && cbHeight <16)". When both the width and height of the current block are smaller than 16 samples, the condition would be false, and the sub-block merge list would be disabled. Accordingly, the next syntax element is not the "merge_subblock_flag [x0][y0]". The syntax element "merge_subblock_flag [x0][y0]" would be inferred to be false.

Embodiment C

In another embodiment, a predefined threshold representing a number of samples within a coding block may be used to constrain the size of a current block which may use the sub-block based merge list. When the number of luma samples of the current block is smaller than the threshold, all sub-block merge modes are disabled for the current block. The usage flag of a sub-block based merge list may be inferred as false. In one example, the threshold value may be 64 luma samples. In another example, the threshold value may be 128 luma samples. The value of the threshold may be any number, and is not limited to the examples.

In another embodiment, the threshold, instead of being predefined, may be signaled in a bitstream. For example, the threshold can be signaled in a sequence parameter set (SPS), a picture parameter set (PPS), a slice header, a tile group header, and the like.

FIG. 13 shows a syntax table (1300) according to an embodiment of the disclosure. The syntax table (1300) is similar to the syntax table (1100). A size threshold (64 samples within a coding block) is used at line 4 and line 11 to determine if a sub-block merge list is disabled for decoding a current block at the position of [x0, y0]. In contrast to FIG. 11, the condition for comparing the size of the current block is represented as "!(cbWidth*cbHeight<64)". The size of the current block, represented by a number of samples within the current block, is denoted by cbWidth*cbHeight. When the number of samples within the current block is smaller than 64 samples, the condition would be false, and the sub-block merge list would be disabled. Accordingly, the next syntax element is not the "merge subblock flag [x0][y0]". The syntax element "merge_subblock_flag [x0][y0]" would be inferred to be false.

IV. Disabling a Category of Sub-Block Based Merge Candidates

To solve the problem of high computational cost incurred by employment of sub-block based merge list, in some embodiments, one or more specific types of sub-block merge modes can be disabled separately. When a current block having a small size when compared with a mode-specific size threshold (or a type-related size threshold), a respective sub-lock merge mode can be disabled. As a result, no candidates of the disabled sub-block merge mode are added to a sub-block merge list used for encoding or decoding the current block.

In some examples, when sub-block based merge candidates are constructed in an individual merge list (separated from block based merge list), separate conditions of current block size may be used for disabling each category of sub-block based merge candidates, so that the disabled category of candidates may not be added to the individual merge list.

In some examples, some categories of sub-block based merge candidates are conditionally included in a sub-block merge list. The sub-block merge list may not always include all the categories of the sub-block based merge candidates.

In some examples, similarly, when a sub-block merge candidate list is used as an individual merge list, only sub-block based candidates are included. The sub-block based candidates may be any kind of sub-block based inter merge candidates, and are not limited to the aforementioned sub-block based merge candidate types (affine candidate, SbTMVP candidate, STMVP candidate, Planar MV candidate, etc.).

Embodiment D

In an embodiment, when a condition of a size of a current block is met, affine merge candidates may not be added to a sub-block merge candidate list. The condition may be one of the following:

(a) The height or width of the current block is smaller than a threshold, for example, in number of samples;

(b) The height or width of the current block is smaller than or equal to a threshold;

(c) The height and width of the current block are both smaller than a threshold;

(d) The height and width of the current block are both smaller than or equal to a threshold;

(e) The value of height*width is smaller than a threshold;

(f) The value of height*width is smaller than or equal to a threshold.

In one embodiment, when either the width or the height of the current block is less than 8 luma samples, affine merge candidates may be disabled and not added to the sub-block merge candidate list.

Embodiment E

In an embodiment, when another condition of a size of a current block is met, SbTMVP candidates may not be added to a sub-block merge candidate list. The condition may be one of the following:

(a) The height or width of the current block is smaller than a threshold;

(b) The height or width of the current block is smaller than or equal to a threshold;

(c) The height and width of the current block are both smaller than a threshold;

(d) The height and width of the current block are both smaller than or equal to a threshold;

(e) The value of height*width is smaller than a threshold;

(f) The value of height*width is smaller than or equal to a threshold.

In one embodiment, when the current block's width and height are both less than 8 luma samples, the SbTMVP candidates may be disabled and not added to the sub-block merge candidate list.

Embodiment F

When another condition of a size of a current block is met, Planar MV prediction candidates may not be added to a sub-block merge candidate list. The condition may be one of the following:

(a) The height or width of the current block is smaller than a threshold;
(b) The height or width of the current block is smaller than or equal to a threshold;
(c) The height and width of the current block are both smaller than a threshold;
(d) The height and width of the current block are both smaller than or equal to a threshold;
(e) The value of height*width is smaller than a threshold;
(f) The value of height*width is smaller than or equal to a threshold.

In one embodiment, when the current block's width and height are both less than 16 luma samples, the SbTMVP candidate may be disabled and not added to the candidate list.

Embodiment G

Other categories of sub-block based merge candidates other than the types of sub-block based merge candidates described in Embodiments D-F, may also be disabled conditionally using separate conditions for each category.

Embodiment H

In an embodiment, when constructing a sub-block merge list, when the sub-block merge candidate list is empty, or the number of available sub-block based merge candidates is less than a maximum allowed number of candidates, some generated merge candidates may be added to the sub-block merge list until the number of candidates is equal to the maximum allowed number.

In one example, zero motion candidates are used for those remaining empty positions on the sub-block merge candidate list until the sub-block merge candidate list is full. Those zero candidates have zero spatial displacement and a reference picture index which starts from zero and increases every time a new zero motion candidate is added to the list. The number of reference pictures used by these candidates is one and two for uni- and bi-directional prediction, respectively.

For example, the first zero candidates may use a first reference picture with an index of 0 on a first reference picture list, L0, and a first reference picture with an index of 0 on a second reference picture list, L1 for bi-directional predictions (each including two motion vectors) in sub-blocks of a current block. The second zero candidates may use a second reference picture with an index of 1 on L0, and a second reference picture with an index of 1 on L1 for bi-directional predictions (each including two motion vectors) in sub-blocks of the current block.

In another example, if there are at least 2 sub-block based candidates added to a sub-block merge list, and at least a first one of the candidates has MVs on L0 and a second one of the candidates has MVs on L1, combined bi-predictive sub-block based candidates are generated. In an example, combined bi-predictive sub-block merge candidate is used for B-Slice only. The combined bi-predictive sub-block candidates are generated by combining first reference picture list (e.g., L0 or L1) motion parameters of the first candidate with second reference picture list (e.g., L1 or L0) motion parameters of the second candidate on each sub-block. If these two sets of motion parameters provide different motion hypotheses, they will form a new bi-predictive sub-block based candidate. In an example, if the sub-block merge list is not full after adding all available combined bi-predictive sub-block based candidates, zero motion candidates are added to the sub-block merge list until the sub-block merge list is full.

Embodiment I

In one embodiment, the type-related threshold values used in aforementioned conditions for separately determining whether a specific type of sub-block merge candidates is disabled may be predefined.

In another embodiment, the type-related threshold values used in aforementioned conditions for separately determining whether a specific type of sub-block merge candidates is disabled may be signaled in a bitstream. For example, the type-related threshold can be signaled in a sequence parameter set (SPS), a picture parameter set (PPS), a slice header, a tile group header, and the like.

Embodiment J

The mechanism of using separate conditions of a size of a current block for disabling each category of sub-block based merge candidates can be applied for a sub-block based merge mode with residual data or a skip mode where a sub-block based merge mode is used without coding residual data. For example, when a current block is processed with a sub-block merge list, residues of the current block can be coded when a skip mode is not used. In contrast, in other examples, the skip mode may be used. Accordingly, a current block is processed with a sub-block merge list without coding the residues.

In addition, the constraints applied for a same type of sub-block merge candidates may be different for a merge mode with residual data and for a skip mode for processing coding blocks. For example, a first size threshold can be used for disabling affine mode for merge mode with residual data. A second size threshold can be used for disabling affine mode for skip mode. The first and second size threshold can be different.

In various embodiments, when a current block is coded in skip mode (sub-block based merge mode without residual data) or sub-block based merge mode with residual data, sub-block based merge candidates may be disabled for constructing a sub-block based merge list in one of the following ways.

In one embodiment, all sub-block based merge candidates may be disabled. In other words, the entire sub-block based merge list is disabled, and no candidate may be added to the sub-block based merge list.

In another embodiment, only affine merge candidates may be disabled and not added to the list.

In another embodiment, only sub-block based merge candidates other than affine merge candidates may be disabled and not added to the list.

In another embodiment, affine merge candidates and other sub-block based candidates are disabled using separate conditions.

V. Process of Disabling a Sub-block Based Merge Mode

Figure 14:
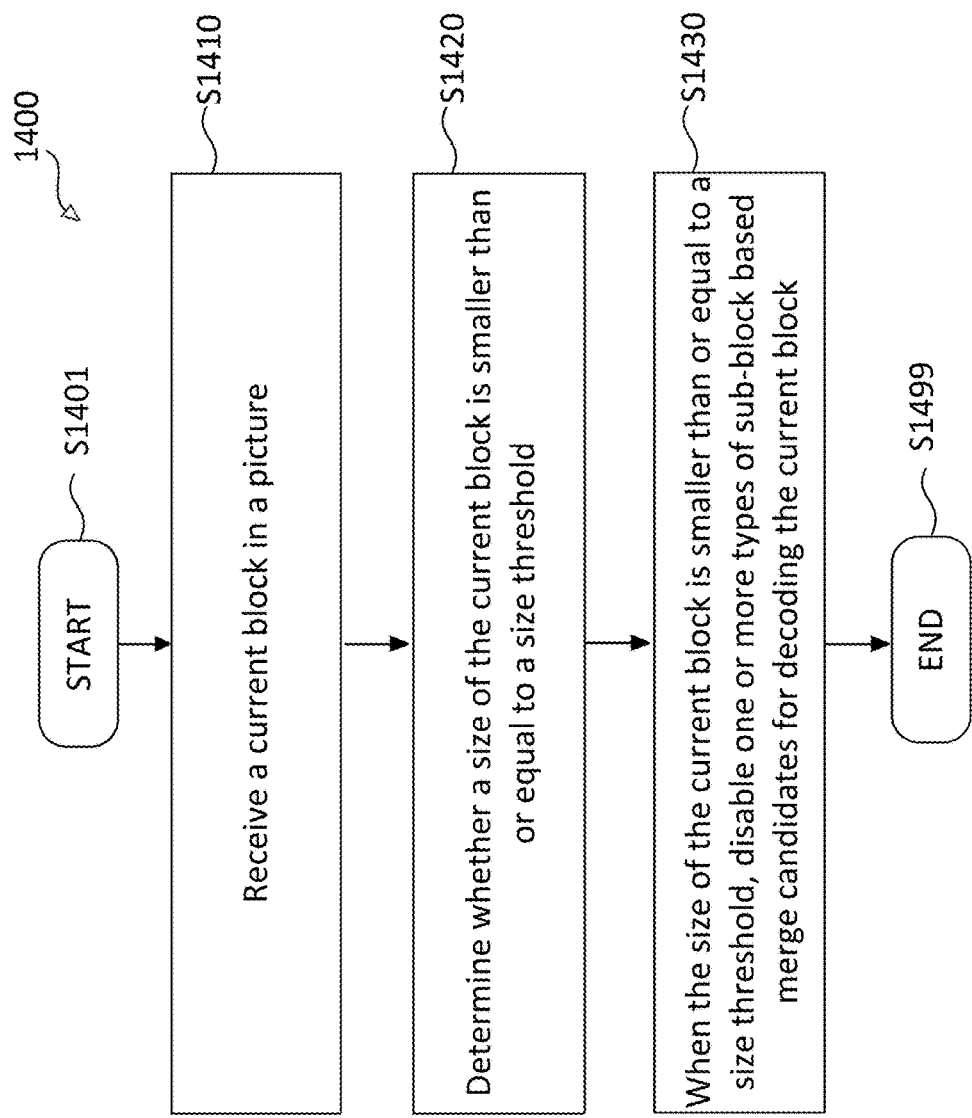
FIG. 14 shows a process of disabling one or more types of sub-block based merge candidates according to some embodiments.

FIG. 14 shows a process (1400) of disabling one or more types of sub-block based merge candidates according to some embodiments of the disclosure. The process (1400) can be performed for decoding a current block. In various embodiments, the process (1400) are executed by processing circuitry, such as the processing circuitry in the terminal devices (210), (220), (230) and (240), the processing circuitry that performs functions of the video decoder (310), the processing circuitry that performs functions of the video decoder (410), the processing circuitry that performs functions of the video decoder (710), and the like. In some embodiments, the process (1400) is implemented in software instructions, thus when the processing circuitry executes the software instructions, the processing circuitry performs the process (1400). The process starts at (S1401) and proceeds to (S1410).

At (S1410), the current block can be received. For example, the current block can have a certain size indicated by a width and a height of the current block.

At (S1420), whether the size of the current block is smaller or equal to a size threshold is determined. In an example, when one of the height or width of the current block is smaller than or equal to a threshold, it can be determined the size of the current block is smaller or equal to the size threshold. In an example, when both the height and width of the current block is smaller than or equal to a threshold, it is determined the size of the current block is smaller or equal to the size threshold. In an example, when a number of samples in the current block is smaller than or equal to a threshold, it is determined the size of the current block is smaller or equal to the size threshold. In different examples, different size threshold can be used.

At S(1430), one or more types of sub-block based merge candidates can be disabled for decoding the current block when the size of the current block is smaller or equal to the size threshold.

In an example, the size threshold is a type-related size threshold specified for one or more sub-block based merge modes. Accordingly, the respective sub-block based merge modes are disabled. In other words, one or more types of sub-block based merge candidates corresponding to the respective one or more disabled sub-block based merge mode are not used for constructing a sub-block merge list used for decoding the current block.

In some examples, each of the one or more types of sub-block based merge candidates can have a respective type-related size threshold. Those respective type-related size thresholds can be different or the same for a subset or all of the different types of sub-block based merge candidates. The steps of (S1420) and (S1430) can be performed for each type-related size threshold, such that each type of the sub-block based merge candidates can be disabled separately according to their respective type-related size thresholds.

In an example, the size threshold is specified for disabling a sub-block based merge candidate list. Accordingly, the sub-block based merge list is disabled. In other words, no sub-block merge list is used for decoding the current block. The process (1400) can proceed to (S1499) and terminates at (S1499).

VI. Computer System

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
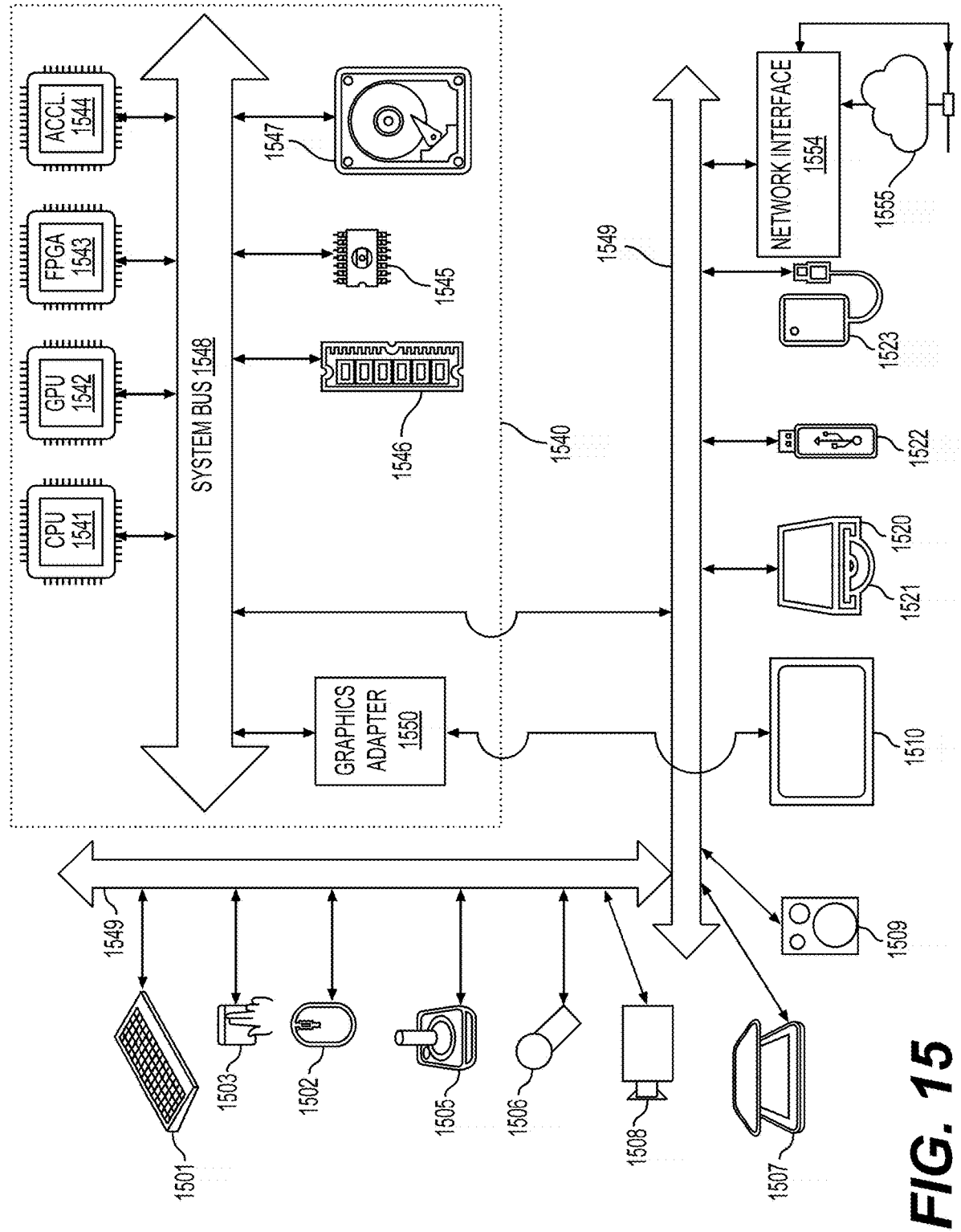
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit CU: Coding Unit
HMVP: History-based MVP
MVP: Motion Vector Predictor
TMVP: Temporal MVP
TPM: Triangular Prediction Mode
VTM: Versatile test model
ATMVP: Advanced Temporal Motion Vector Prediction
SbTMVP: Sub-block Based Temporal Motion Vector Prediction
POC: Picture Order Count
STMVP: Spatial-Temporal Motion Vector Prediction
SPS: Sequence Parameter Set
PPS: Picture Parameter Set While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
   receiving encoded data associated with a current block in a picture;
   determining whether a size of the current block is smaller than or equal to a size threshold; and
   when the size of the current block is smaller than or equal to the size threshold, disabling one or more types of sub-block based merge candidates for decoding the current block,
   wherein the disabling one or more types of sub-block based merge candidates for decoding the current block includes:
      inferring a first flag as false, the first flag indicating whether a sub-block based merge candidate list is used for decoding the current block; and
      disabling the sub-block based merge candidate list for decoding the current block.

2. The method of claim 1, further comprising:
   when the size of the current block is greater than the size threshold, obtaining from the encoded data the first flag indicating whether the sub-block based merge candidate list is used for decoding the current block.

3. The method of claim 1, wherein the determining whether the size of the current block is smaller than or equal to the size threshold includes:
   determining whether a height or a width of the current block is smaller than or equal to the size threshold.

4. The method of claim 1, wherein the determining whether the size of the current block is smaller than or equal to the size threshold includes:
   determining whether a height and a width of the current block are both smaller than or equal to the size threshold.

5. The method of claim 1, wherein the determining whether the size of the current block is smaller than or equal to the size threshold includes:
   determining whether a number of samples in the current block is smaller than or equal to the size threshold.

6. The method of claim 1, further comprising:
   obtaining from the encoded data a syntax element indicating the size threshold.

7. The method of claim 1, further comprising:
   obtaining from the encoded data a second flag indicating whether a skip mode is enabled for coding the current block; and
   when the second flag indicates that the skip mode is disabled, obtaining from the encoded data a third flag indicating whether a merge mode is enabled for coding the current block.

8. The method of claim 1, wherein the one or more types of sub-block based merge candidates include one of:
   an affine merge candidate,
   a sub-block based temporal motion vector prediction (SbTMVP) candidate,
   a spatial-temporal motion vector prediction (STMVP) candidate, or
   a planar motion vector prediction candidate.

9. A method of video decoding at a video decoder, comprising:
   receiving encoded data associated with a current block in a picture to be decoded using a sub-block based merge candidate list; and
   constructing the sub-block based merge candidate list for decoding the current block, including:
      for each one of a plurality of types of sub-block based prediction mode usable for constructing the sub-block based merge candidate list,
         determining whether a size of the current block is smaller than or equal to a respective size threshold,
         when the size of the current block is determined to be smaller than or equal to the respective size threshold, disabling the respective type of sub-block based prediction mode for constructing the sub-block based merge candidate list, and
         when the size of the current block is determined to be greater than the respective size threshold, performing the respective type of sub-block based prediction mode for constructing the sub-block based merge candidate list.

10. The method of claim 9, wherein the respective size thresholds of the plurality of types of sub-block based prediction mode are the same.

11. The method of claim 9, wherein the determining whether the size of the current block is smaller than or equal to the respective size threshold includes:
    determining whether a height or a width of the current block is smaller than or equal to the respective size threshold.

12. The method of claim 9, wherein the determining whether the size of the current block is smaller than or equal to the respective size threshold includes:
    determining whether a height and a width of the current block are both smaller than or equal to the respective size threshold.

13. The method of claim 9, wherein the determining whether the size of the current block is smaller than or equal to the respective size threshold includes:
    determining whether a number of samples in the current block is smaller than or equal to the respective size threshold.

14. The method of claim 9, wherein the plurality of types of sub-block based prediction mode includes:
    an affine merge mode,
    a sub-block based temporal motion vector prediction (SbTMVP) mode,
    a spatial-temporal motion vector prediction (STMVP) mode, or
    a planar motion vector prediction mode.

15. The method of claim 9,
wherein the constructing the sub-block based merge candidate list comprises
adding one or more generated sub-block merge candidates generated according to a subset of the plurality of types of sub-block based prediction mode performed according to the respective size thresholds of the plurality of types of sub-block based prediction mode, until a number of sub-block merge candidates included in the sub-block based merge candidate list is equal to a maximum allowed number of sub-block merge candidates for the sub-block based merge candidate list.

16. The method of claim 15, wherein the constructing the sub-block based merge candidate list further comprises:
adding a zero motion candidate to the sub-block based merge candidate list.

17. The method of claim 15, wherein the constructing the sub-block based merge candidate list further comprises:
adding combined bi-predictive sub-block merge candidates to the sub-block based merge candidate list.

18. An apparatus of video decoding, comprising circuitry configured to:
receive encoded data associated with a current block in a picture;
determine whether a size of the current block is smaller than or equal to a size threshold; and
when the size of the current block is smaller than or equal to a size threshold, disable one or more types of sub-block based merge candidates for decoding the current block,
wherein the circuitry is configured to disable the one or more types of sub-block based merge candidates for decoding the current block by performing:
inferring a first flag as false, the first flag indicating whether a sub-block based merge candidate list is used for decoding the current block; and
disabling the sub-block based merge candidate list for decoding the current block.

19. The apparatus of claim 18, wherein the circuitry is further configured to:
when the size of the current block is greater than the size threshold, obtain from the encoded data the first flag indicating whether the sub-block based merge candidate list is used for decoding the current block.

* * * * *